(12) United States Patent
Durrant et al.

(10) Patent No.: US 9,588,304 B2
(45) Date of Patent: Mar. 7, 2017

(54) SECURE SC OPTICAL FIBER CONNECTOR AND REMOVAL TOOLS

(71) Applicant: Advanced Fiber Products, LLC, Des Plaines, IL (US)

(72) Inventors: Richard C. E. Durrant, Crystal Lake, IL (US); Darren J. M. Adams, Haverhill (GB)

(73) Assignee: Optical Fiber Packaging Corp., Crystal Lake, IL (US)

( * ) Notice: Subject to any disclaimer, the term of this patent is extended or adjusted under 35 U.S.C. 154(b) by 0 days.

(21) Appl. No.: 14/973,659

(22) Filed: Dec. 17, 2015

(65) Prior Publication Data

US 2016/0116686 A1    Apr. 28, 2016

Related U.S. Application Data

(63) Continuation of application No. 13/899,535, filed on May 21, 2013, now Pat. No. 9,316,791.

(60) Provisional application No. 61/649,867, filed on May 21, 2012, provisional application No. 61/809,872, filed on Apr. 8, 2013.

(51) Int. Cl.
*G02B 6/38* (2006.01)
*G02B 6/24* (2006.01)

(52) U.S. Cl.
CPC .......... *G02B 6/3893* (2013.01); *G02B 6/241* (2013.01); *G02B 6/3825* (2013.01); *G02B 6/3831* (2013.01); *G02B 6/3887* (2013.01); *G02B 6/3898* (2013.01); *G02B 6/3849* (2013.01); *G02B 6/3897* (2013.01)

(58) Field of Classification Search
CPC ... G02B 6/3898; G02B 6/3849; G02B 6/3897
See application file for complete search history.

(56) References Cited

U.S. PATENT DOCUMENTS

| | | | | |
|---|---|---|---|---|
| 4,208,092 A | * | 6/1980 | Monaghan | G02B 6/3875 385/55 |
| 2001/0019654 A1 | * | 9/2001 | Waldron | G02B 6/383 385/134 |
| 2004/0218885 A1 | * | 11/2004 | Segroves | B25B 7/12 385/134 |
| 2005/0158051 A1 | * | 7/2005 | Dodds | G02B 6/3897 398/117 |
| 2010/0172616 A1 | * | 7/2010 | Lu | G02B 6/3825 385/78 |
| 2010/0232756 A1 | * | 9/2010 | Hackett | G02B 6/3849 385/134 |
| 2011/0274401 A1 | * | 11/2011 | Hackett | G02B 6/3849 385/134 |

(Continued)

*Primary Examiner* — Thomas A Hollweg
*Assistant Examiner* — Mary A El Shammaa
(74) *Attorney, Agent, or Firm* — Steven M. Evans; Chicago IP Law

(57) ABSTRACT

An optical fiber connector plug having an anti-snag guide to prevent the plug from being caught on corners and edges when an attached cable is being pulled around corners and edges during installation and removal of the optical fiber connector plug. The optical fiber connector plug includes a unique arrangement of different width apertures corresponding to a removal tool having corresponding different width prongs to be received by the apertures to release the optical fiber connector plug from a coupling adapter.

11 Claims, 20 Drawing Sheets

(56) References Cited

U.S. PATENT DOCUMENTS

2012/0030937 A1\* 2/2012 Wang .................. G02B 6/3893
29/825

\* cited by examiner

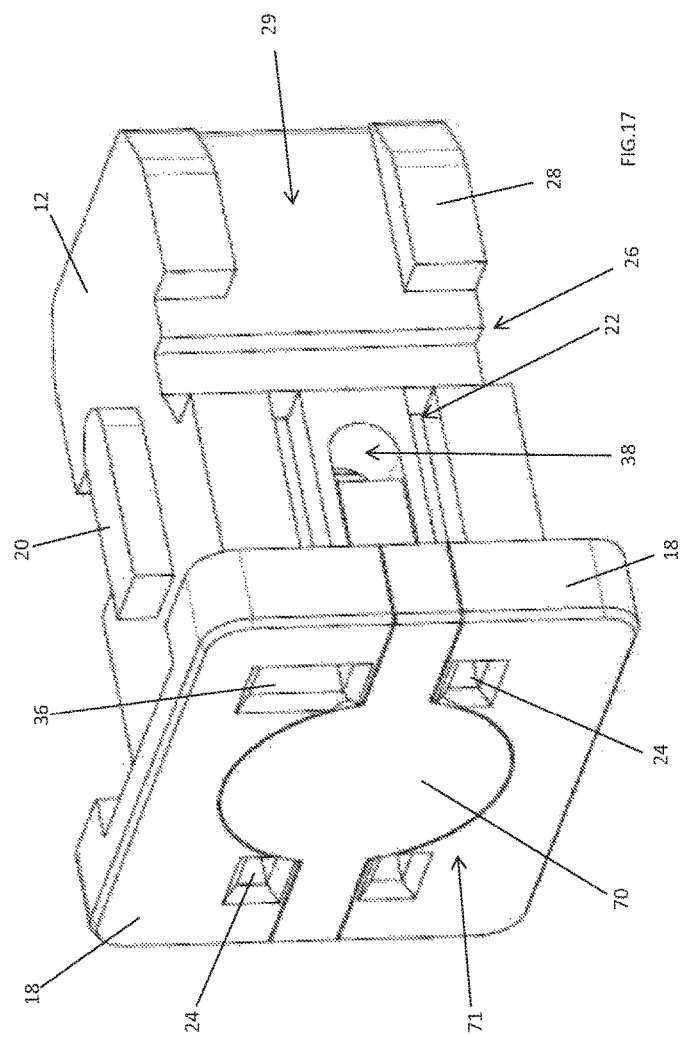

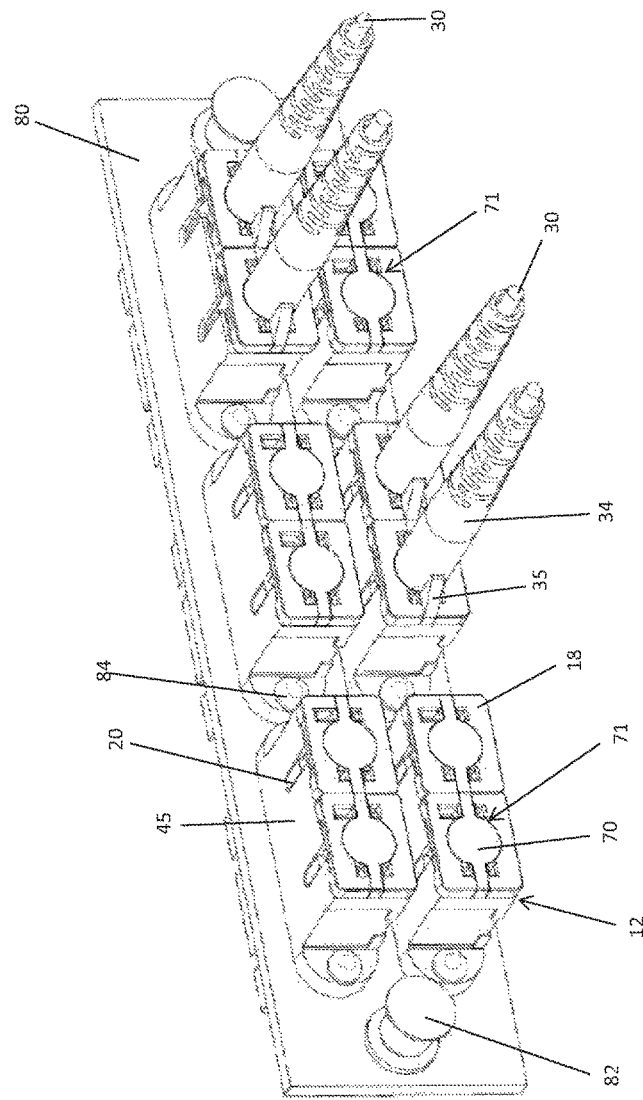

SECURE SC OPTICAL FIBER CONNECTOR AND REMOVAL TOOLS

REFERENCE TO RELATED APPLICATIONS

This is a continuation patent application of U.S. application Ser. No. 13/899,535, filed on May 21, 2013, which claims priority to (1) U.S. provisional patent application entitled "Secure SC Optical Fiber Connector And Removal Tool," having Ser. No. 61/649,867, filed on May 21, 2012; and (2) U.S. provisional patent application entitled "Secure SC Optical Fiber Connector And Removal Tools," having Ser. No. 61/809,872, filed on Apr. 8, 2013; the entirety of both of these provisional patent applications hereby being incorporated by reference into the present patent application.

BACKGROUND OF THE INVENTION

Field of the Invention

The present invention relates generally to optical fiber connectors, and more particularly, to secure SC connectors that can only be disconnected with specific removal tools.

Description of Related Art

Optical fiber connectors are commonly used in both civilian and military applications. In both of these applications, security is an issue. Not only is it important to properly connect the correct optical fiber connector plug to the correct corresponding optical fiber connector, it also is important to prevent a connected optical fiber connector plug from being removed by an unauthorized user. Furthermore, it is important to prevent an optical fiber connector port from being accessed by an unauthorized user.

Additionally, it is very common for optical fiber connector plugs to get caught or snagged on surrounding optical fiber cables, other optical fiber connector plugs, and edges and corners of cable trays, conduits and the like when optical fiber cables having optical fiber connector plugs are being installed or removed.

Accordingly, there is a need to provide an optical fiber connector plug and optical fiber connector that facilitates optical fiber connector plugs being connected to correct corresponding optical fiber connectors. Furthermore, there also is a need to provide an optical fiber connector plug that cannot be disconnected by unauthorized user. Moreover, there is a need for an optical fiber connector plug that does not get caught and snagged when the attached optical fiber cable is being pulled around edges and corners during installation or on retrieval.

ASPECTS AND SUMMARY OF THE PRESENT INVENTION

One aspect of the present invention is to provide an optical fiber connector plug that includes an anti-snag guide to prevent the optical fiber connector plug or connector from being caught on corners and edges when the attached cable is being pulled around corners and edges during installation and removal.

Another aspect of the present invention is to provide optical fiber connector plugs or connectors that can only be disconnected with specific keyed removal tools. The optical fiber connectors or plugs have different color coded features on the connector body such as an anti-snag feature, to identify their keyway, and only a removal tool having the same color and mechanically matched keyway can unlock and remove an optical fiber connector plug having the same color anti-snag guide.

The present invention provides an unlocking and release tool for an optical fiber SC connector. A standard SC connector typically has an outer shroud that pulls or slides back to release the latch arms in the coupling adaptor/receptacle to release the plug. It's a push-pull design with an inner body component and a sliding outer release shroud. The present invention is a single body that eliminates the outer shroud that an operator normally pulls back. Additionally, the present invention is designed to restrict physical access, tampering, or insertion of any objects or unauthorized tools to force de-latching. Accordingly, when a Secure SC connector is plugged in, there is no access to lift the latch arms in the coupling adaptor to disconnect it.

The present invention enables the optical fiber connector plug to be unlocked and removed by providing multiple slots passing through the back plate of the optical fiber connector plug, allowing corresponding matching prongs, wherein at least one prong can be a different width or shape, of the release tool to protrude under the latch arms in the receiving or coupling adapter when inserted. The design is compatible with industry standard SC interfaces.

The present invention provides an unlocking and release tool for an optical fiber SC connector. A standard SC connector typically has a blue, green or beige outer shroud that pulls or slides back to release the latch arms in the coupling adaptor/receptacle to release the plug. It's a push-pull design with an inner body component and a sliding outer release shroud. The present invention is a single body that eliminates the outer shroud that an operator normally pulls back. Additionally, the present invention is designed to restrict physical access, tampering, or insertion of any objects or unauthorized tools to force de-latching. Accordingly, when a Secure SC connector is plugged in, there is no access to lift the latch arms in the adaptor to disconnect it.

The present invention enables the Secure SC connector to be unlocked and removed by providing multiple slots passing through the back of the housing or connector body back-shell, allowing a single or multiple arms or extensions of the release tool to protrude under the latch arms when inserted. The design is compatible with industry standard SC interfaces. The present invention provides a bung or outer shell component to lock out and protect empty ports.

BRIEF DESCRIPTION OF THE DRAWINGS

FIG. 17 is a perspective view of a bung located within the optical fiber connector plug housing shown in FIGS. 14a-e;

FIG. 20 is an SC patch panel array illustrating bungs and optical fiber connector plugs of the present invention connected therein.

DETAILED DESCRIPTION OF THE PREFERRED EMBODIMENTS

Figure 1:
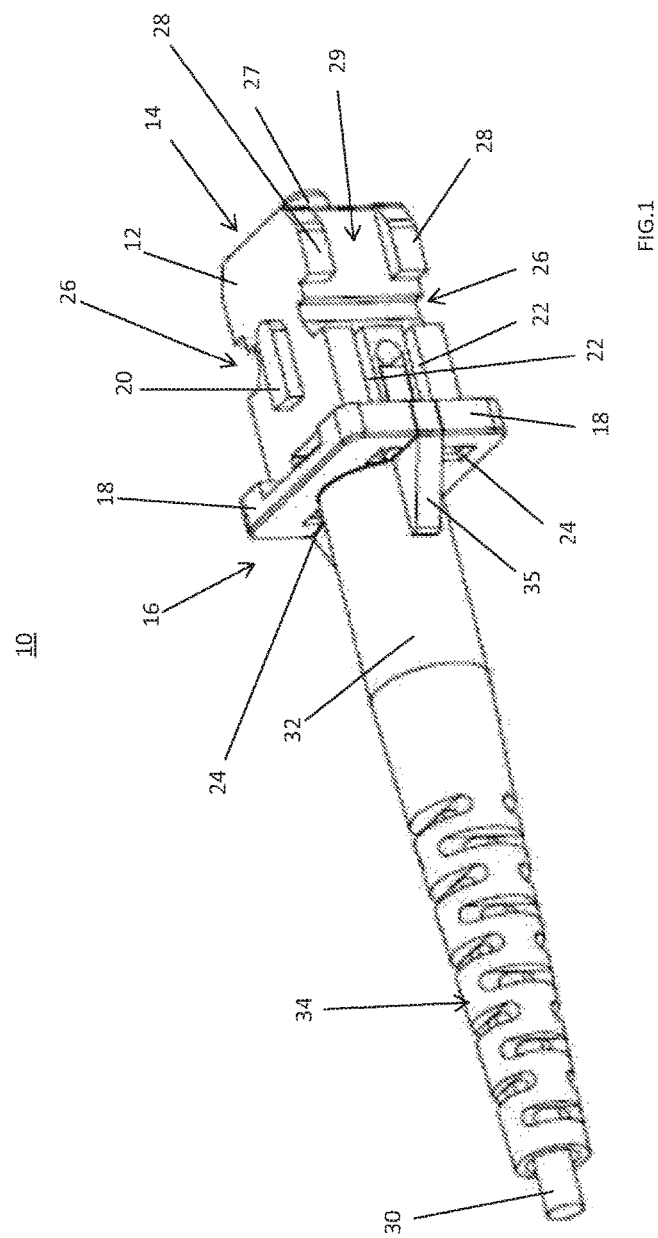
FIG. 1 is a perspective view of an optical fiber connector plug configured in accordance with the present invention.

Referring now to the drawings, FIG. 1 illustrates an optical fiber connector plug 10 configured in accordance with the present invention. The optical fiber connector plug 10 includes a housing 12 having a front 14 and a back 16. The housing 12 includes a back plate, panel, back shell, or shield 18. A keying peg 20 is attached to the top of the housing 12. Guides, slots, channels, or groves 22 are included within the housing 12 for receiving and guiding prongs of a release tool. Apertures 24 within the back plate 18 are adjacent to the grooves or guide 22. When prongs of a release tool are inserted through the apertures 24 in the back plate 18, the prongs are received by and slide into a guide 22 behind each of the apertures 24.

Notches 26 are located within the side of the housing 12 for receiving a locking mechanism, such as a latch arm. Side rails 28 also are included are the sides of the housing 12 forming a slot or groove 29 for guiding the optical fiber connector plug 10 into a coupling adapter. An optical ferrule 27 is contained within the housing 12 and exits the front 14 of the housing 12.

A boot 32 containing an optical fiber is connected to the back plate, back panel, or shield 18 of the housing 12. The optical fiber cable 30 containing the optical ferrule 27 is contained within the boot 32. A plurality of notches 34 are located within a rear portion of the boot 32 for increased flexibility and strain relief. The optical fiber connector plug 10 is preferably constructed of a polymer, such as plastic.

In accordance with the present invention, anti-snag guides 35 are connected to the back plate 18 and the boot 32. The anti-snag guide 35 forms a ramp between the boot 32 and the top or edge of the back plate 18. The anti-snag guide 35 is preferably constructed of plastic to form a ramp that is fitted onto the back plate 18 of the housing or connector body 12. The ramp configuration of the anti-snag guide 35 helps to prevent the back plate 18 of the housing 12 of the optical fiber connector plug 10 from getting caught on edges and corners while the optical fiber connector plug 10 is being pulled by the optical fiber cable 30 during installation or removal of the optical fiber connector plug 10.

Figure 2:
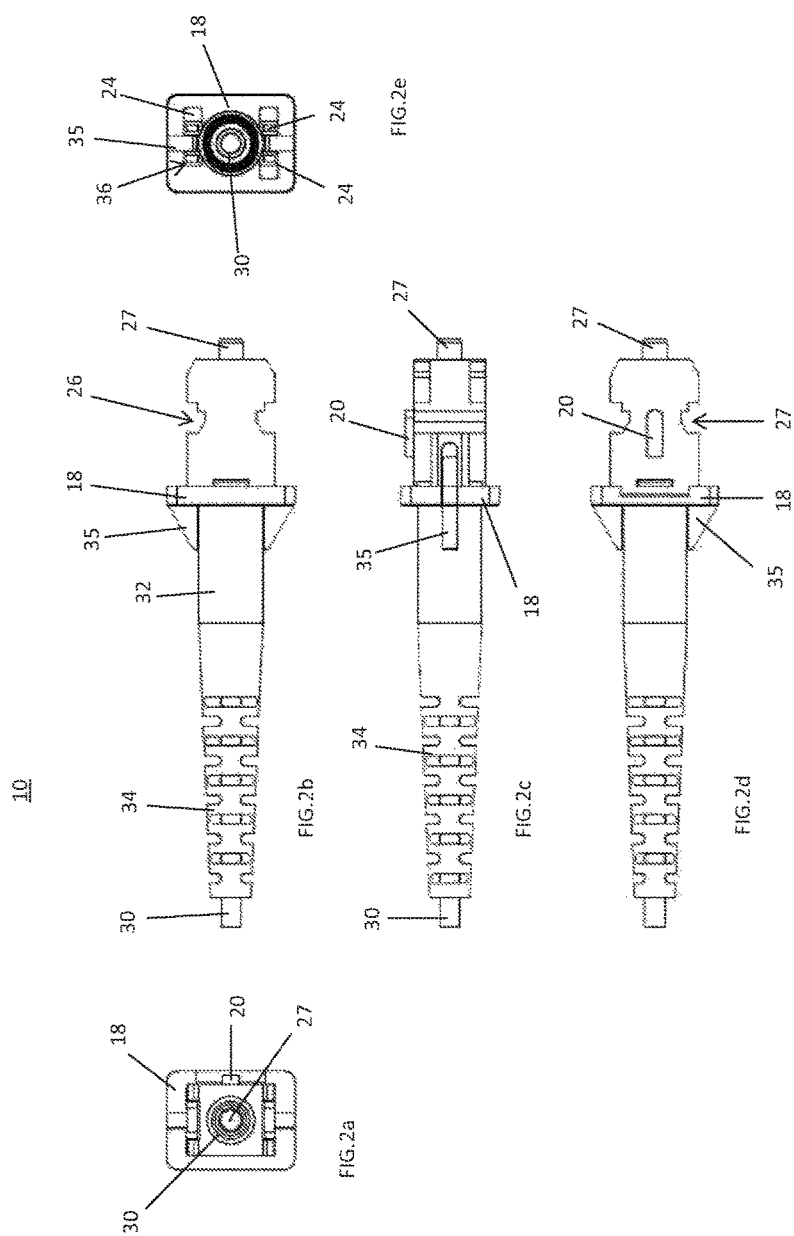
FIG. 2a is a front view of the optical fiber connector plug shown in FIG. 1.
FIG. 2b is a bottom view of the optical fiber connector plug shown in FIG. 1.
FIG. 2c is a side view of the optical fiber connector plug shown in FIG. 1.
FIG. 2d is a top view of the optical fiber connector plug shown in FIG. 1.
FIG. 2e is a back view of the optical fiber connector plug shown in FIG. 1.

FIGS. 2a-2e illustrate different views of the optical fiber connector plug 10 shown in FIG. 1. FIG. 2a shows the front 14 of the optical fiber connector plug 10 having an optical fiber cable 30 containing an optical fiber within a ferrule 27.

FIGS. 2b-d illustrate the bottom, side, and top of the optical fiber connector plug 10, respectively. FIG. 2e illustrates the back 16 of the optical fiber connector plug 10 and the optical fiber cable 30.

In accordance with a further aspect of the present invention, FIG. 2e illustrates the plurality of apertures 24, wherein at least one aperture 36 of the plurality of apertures 24 has a different size, shape, and configuration of the other apertures 24. The different configuration of aperture 36 provides a unique key configuration for prongs of a removal tool, thereby creating a unique key configuration. The position of the apertures 24 can be changed to create additional lock or key combinations, requiring a different removal tool with the correct matching prongs. Furthermore, the apertures 24 can be different in number, such as 2, 3, 4, 5, or 6, and different shapes, such as round, square, rectangle, star, or triangle.

Figure 3:
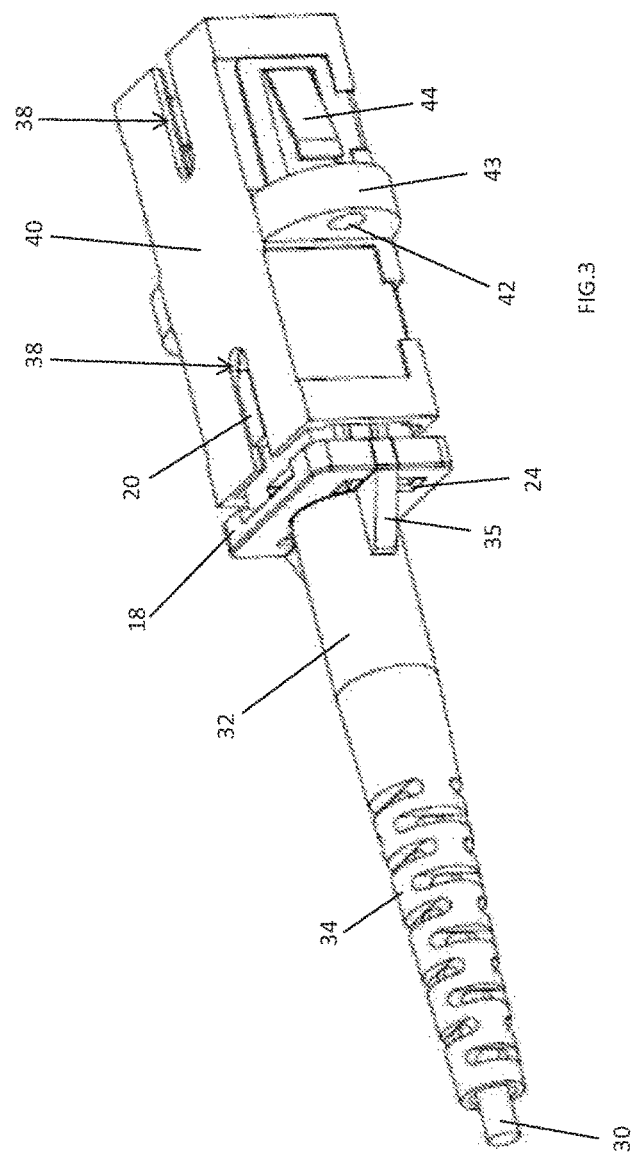
FIG. 3 is a perspective view of the optical fiber connector plug of FIG. 1 connected to a coupling adapter.

FIG. 3 is a perspective view of the optical fiber connector plug 10 located within and connected to an optical fiber connecting receptacle or coupling adapter 40 in accordance with the present invention. The coupling adapter 40 includes a guide slot or groove 38 for receiving the keying peg 20 on the housing 12 of the optical fiber connector plug 10 so as to correctly position and orientate the optical fiber connector plug 10 within the coupling adapter 40. The coupling adapter 40 also includes a mounting bracket 43 having apertures 42 on opposing sides of the coupling adapter 40. The coupling adapter 40 is preferably constructed of plastic. Flexible metal tabs 44 also are included on opposing sides of the coupling adapter 40 for securing the coupling adapter 40 within a panel array or other mounting platform and discharging static charges.

Figure 4:
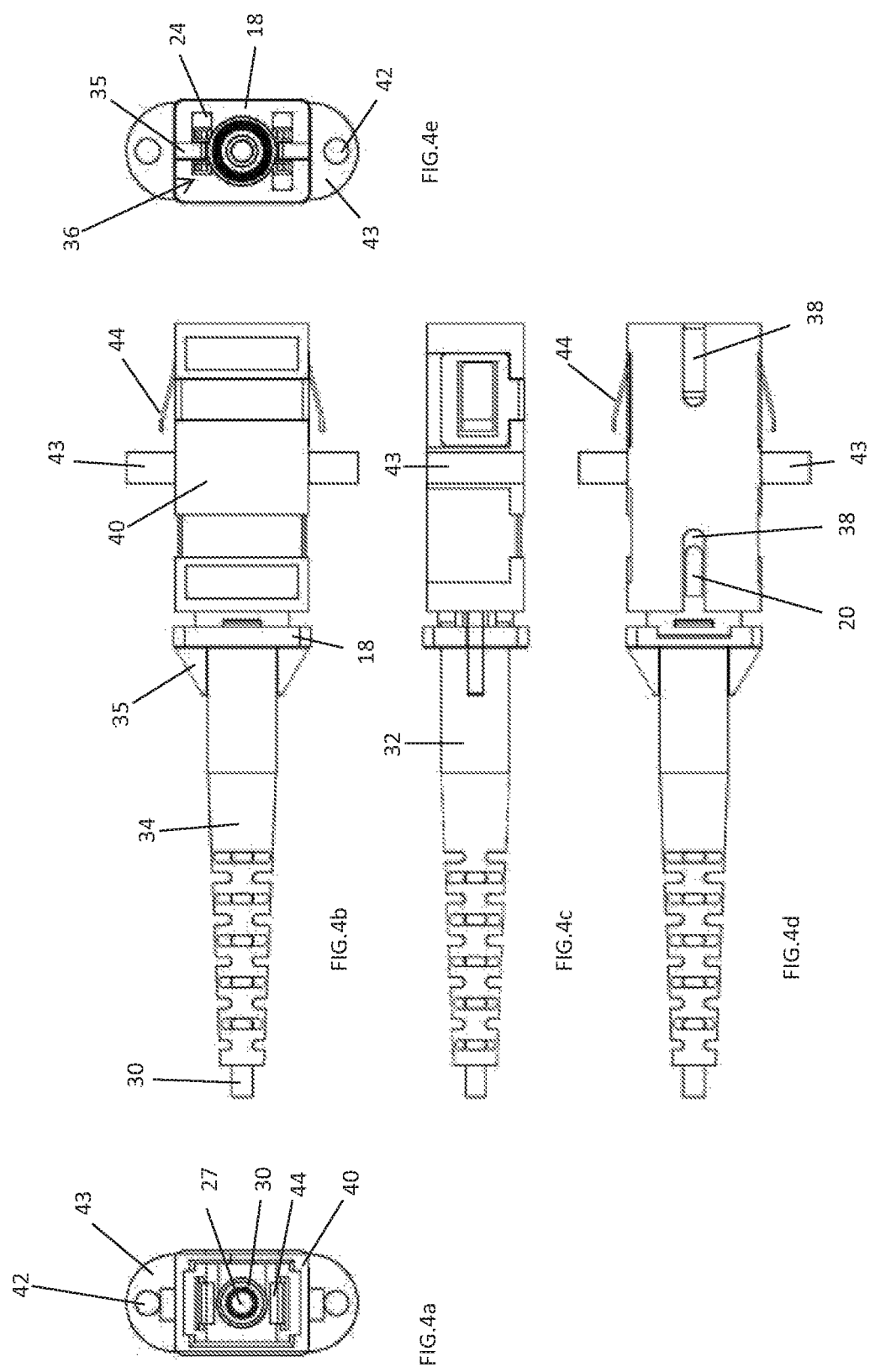
FIG. 4a is a front view of the optical fiber connector plug and coupling adapter shown in FIG. 3.
FIG. 4b is a bottom view of the optical fiber connector plug and coupling adapter shown in FIG. 3.
FIG. 4c is a side view of the optical fiber connector plug and coupling adapter shown in FIG. 3.
FIG. 4d is a top view of the optical fiber connector plug and coupling adapter shown in FIG. 3.
FIG. 4e is a back view of the optical fiber connector plug and coupling adapter shown in FIG. 3.

FIGS. 4a-4e illustrate different views of the optical fiber connector plug 10 connected to and within the coupling adapter 40. FIG. 4a is a front view of the optical fiber connector plug 10 and the coupling adapter 40 showing an optical fiber in the optical ferrule 27 within the optical fiber cable 30. Also illustrated are the bracket 43, aperture 42, and flexible tabs 44 of the coupling adapter 40. FIGS. 4b-4d illustrate the bottom, side, and top of the optical fiber connector plug 10 connected to the coupling adapter 40, respectively. FIG. 4e illustrates the back of the optical fiber connector plug 10 within the coupling adapter 40 showing the apertures 24, back plate 18, anti-snag guide 35, and mounting holes or apertures 42 of mounting bracket 43. The aperture 36 in the back plate 18 having a unique configuration from the other apertures 24 also is illustrated.

Figure 5:
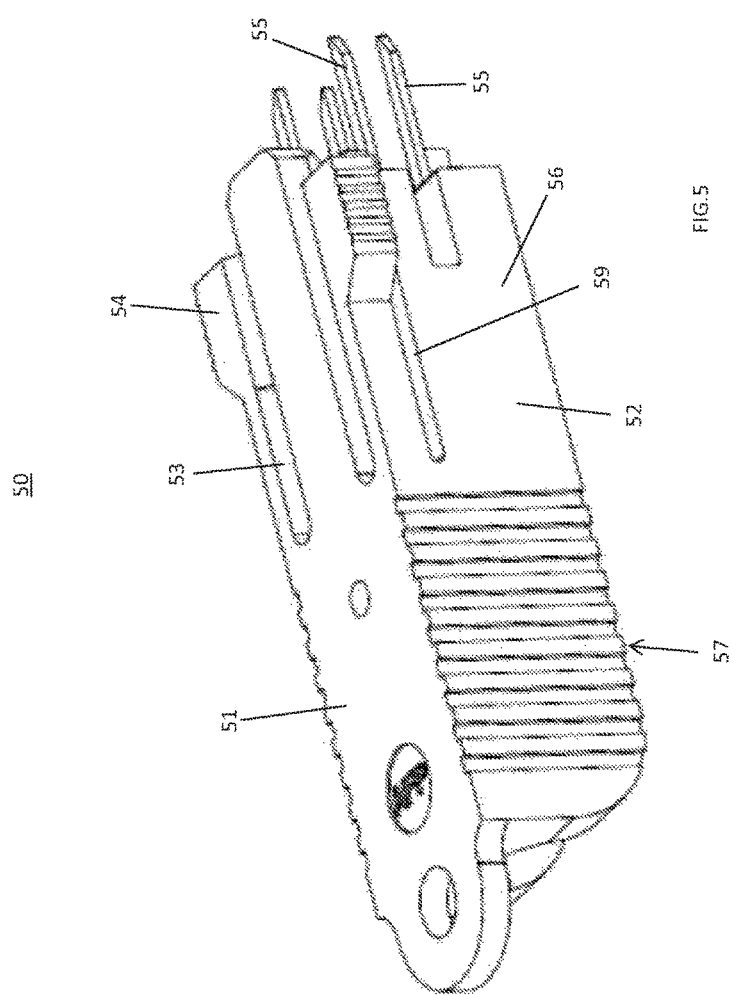
FIG. 5 is a perspective view of a removal tool configured in accordance with the present invention.

FIG. 5 is a perspective view of a removal tool 50 configured in accordance with the present invention. In accordance with another aspect of the present invention, the removal tool 50 includes a plurality of prongs 55 extending longitudinally or parallel with the length of the body 52 of the removal tool 50. Flexible handles 54, formed by slots 53 in the top 51 and slots 59 on opposing sides 56 of the body 52 of the removal tool 50, are provided to move inward when grasped by a user, and clasp the optical fiber connector plug 10 for removal. Ridges are includes on the sides 56 of the body 52 of the removal tool 50 for better gripping of the removal tool 50 when removing an optical fiber connector plug 10 using the removal tool 50.

Figure 6:
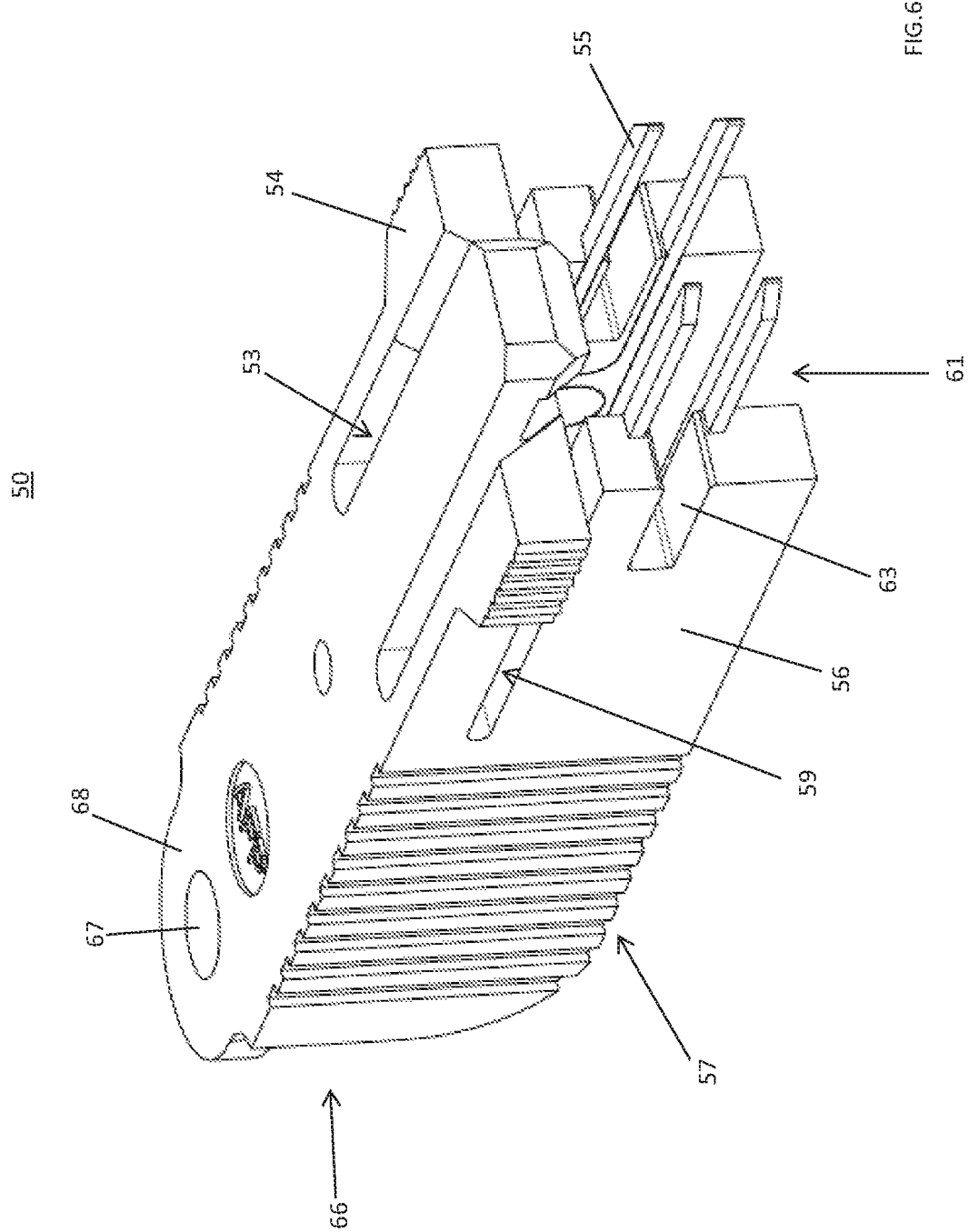
FIG. 6 is another perspective view of the removal tool shown in FIG. 5.

FIG. 6 is a perspective view of the removal tool 50 shown in FIG. 5 from a different angle and showing the prongs 55 at the front 61 of the removal tool 50. Prongs 55 are preferably constructed of metal and extend parallel to one another. The prongs 55 are sized and positioned to be inserted into the apertures 24 of the back plate 18 of the optical fiber connector plug 10. Slots 63 on the sides 56 of the removal tool are positioned and sized to receive the anti-snag guide 35 of the optical fiber connector plug 10.

Figure 7:
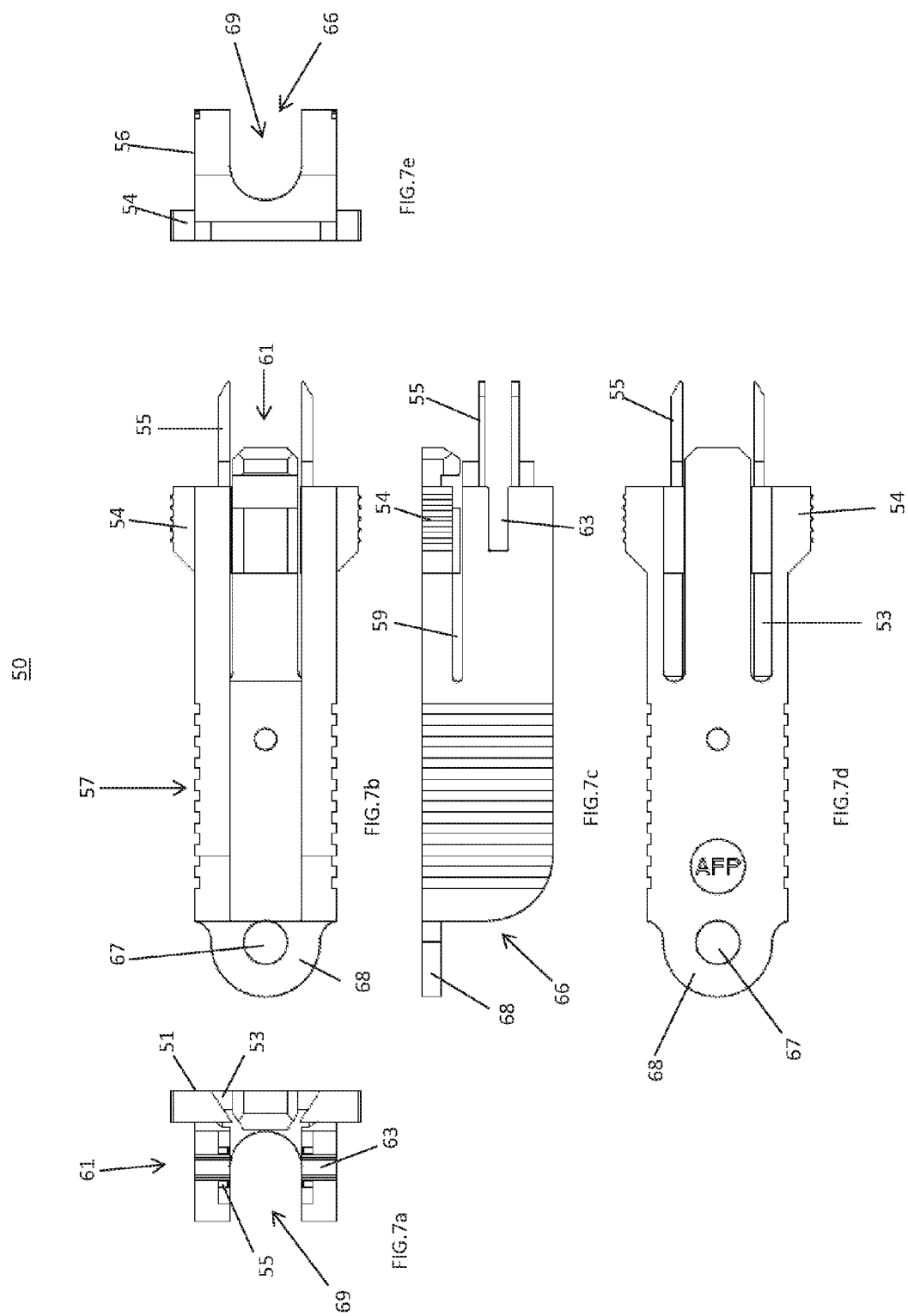
FIG. 7a is a front view of the removal tool shown in FIGS. 5 and 6.
FIG. 7b is a bottom view of the removal tool shown in FIGS. 5 and 6.
FIG. 7c is a side view of the removal tool shown in FIGS. 5 and 6.
FIG. 7d is a top view of the removal tool shown in FIGS. 5 and 6.
FIG. 7e is a back view of the removal tool shown in FIGS. 5 and 6.

FIG. 7a is a front 61 view of the removal tool 50 showing the prongs 55. Also shown are the slots 53 is the top 51 of the removal tool 50 and slots 63 on the sides 56 of the removal tool 50. A cavity 69 is formed within the removal tool 50 by the top 51 and sides 56. The cavity 69 is sized and configured for receiving and covering the optical fiber connector plug 10 during the removal of the optical fiber connector plug 10 from the coupling adapter 40.

FIGS. 7b-d are a bottom view, a side view, and a top view, respectively, of the removal tool 50 shown in FIGS. 5 and 6. FIG. 7e is a view of the rear 66 of the removal tool 50 showing the handles 54 and cavity 69.

Figure 8:
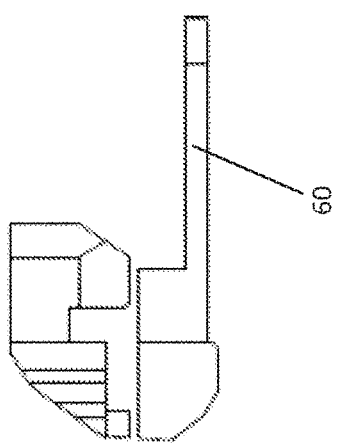
FIG. 8 is a side view of a prong of the removal tool shown in FIGS. 5 and 6.

In accordance with a further aspect of the present invention, FIG. 8 illustrates a side view of a uniquely sized and shape prong 60 relative to the other prongs 55 on the removal tool 50. In the embodiment shown in FIG. 8, prong 60 is narrower in width than the other prongs 55 of the removal tool 50. Of course, in other embodiments the different prong could be wider in width than other prongs 55, or even a different cross sectional configuration.

Figure 9:
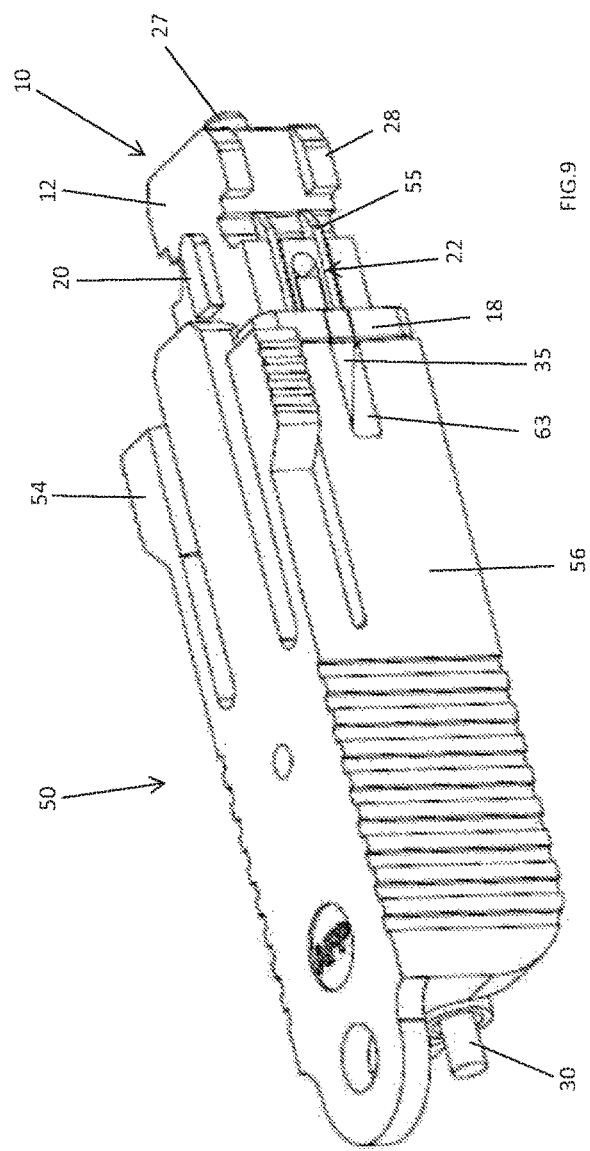
FIG. 9 is a perspective view of the removal tool of FIGS. 5 and 6 attached to the optical fiber connector plug shown in FIG. 1.

FIG. 9 is a perspective view of the removal tool 50 located over the optical fiber connector plug 10 in accordance with the present invention. The prongs 55 are shown located within the guides 22 of the housing 12 of the optical fiber connector plug 10. The anti-snag guide 35 is shown located within the slot 63 on the side 56 of the removal tool 50.

Figure 10:
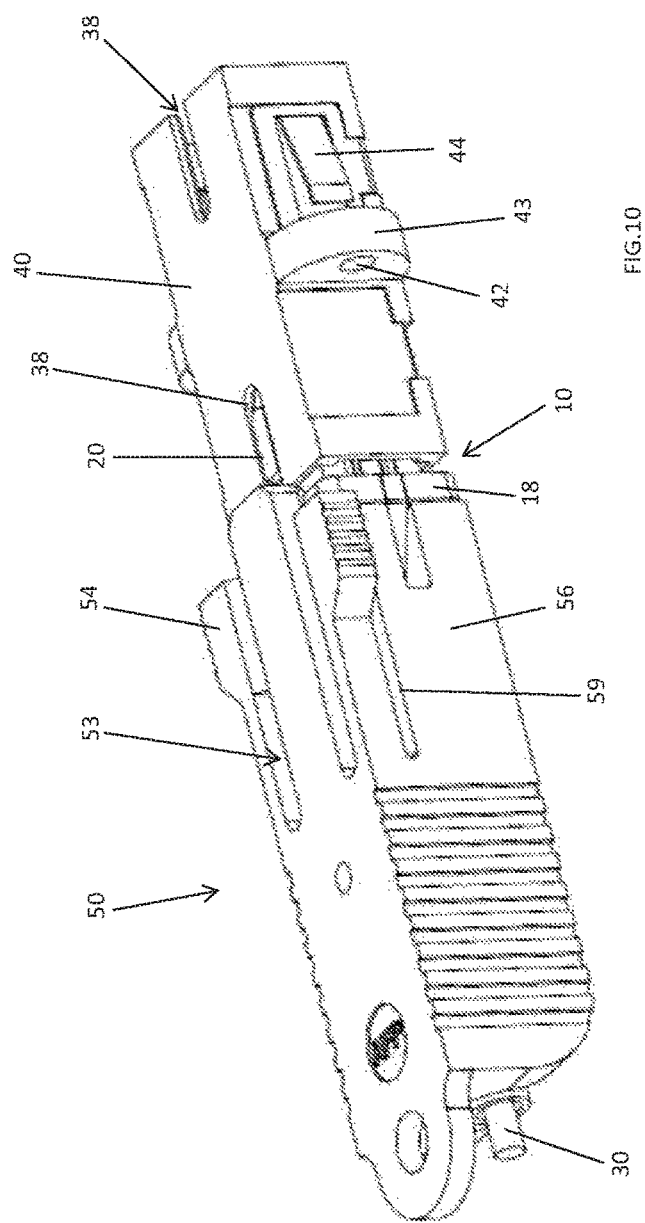
FIG. 10 is a perspective view of the removal tool and optical fiber connector plug shown in FIG. 9 connected to the coupling adapter shown in FIG. 3.

FIG. 10 is a perspective view of the removal tool 50 located over the optical fiber connector plug 10 as shown in FIG. 9, wherein the optical fiber connector plug 10 is located within the coupling adapter 40. The keying peg 20 of the optical fiber connector plug 10 is shown within the guide slot 38 of the coupling adapter 40 to properly position the optical fiber connector plug 10 within the coupling adapter 40.

Figure 11:
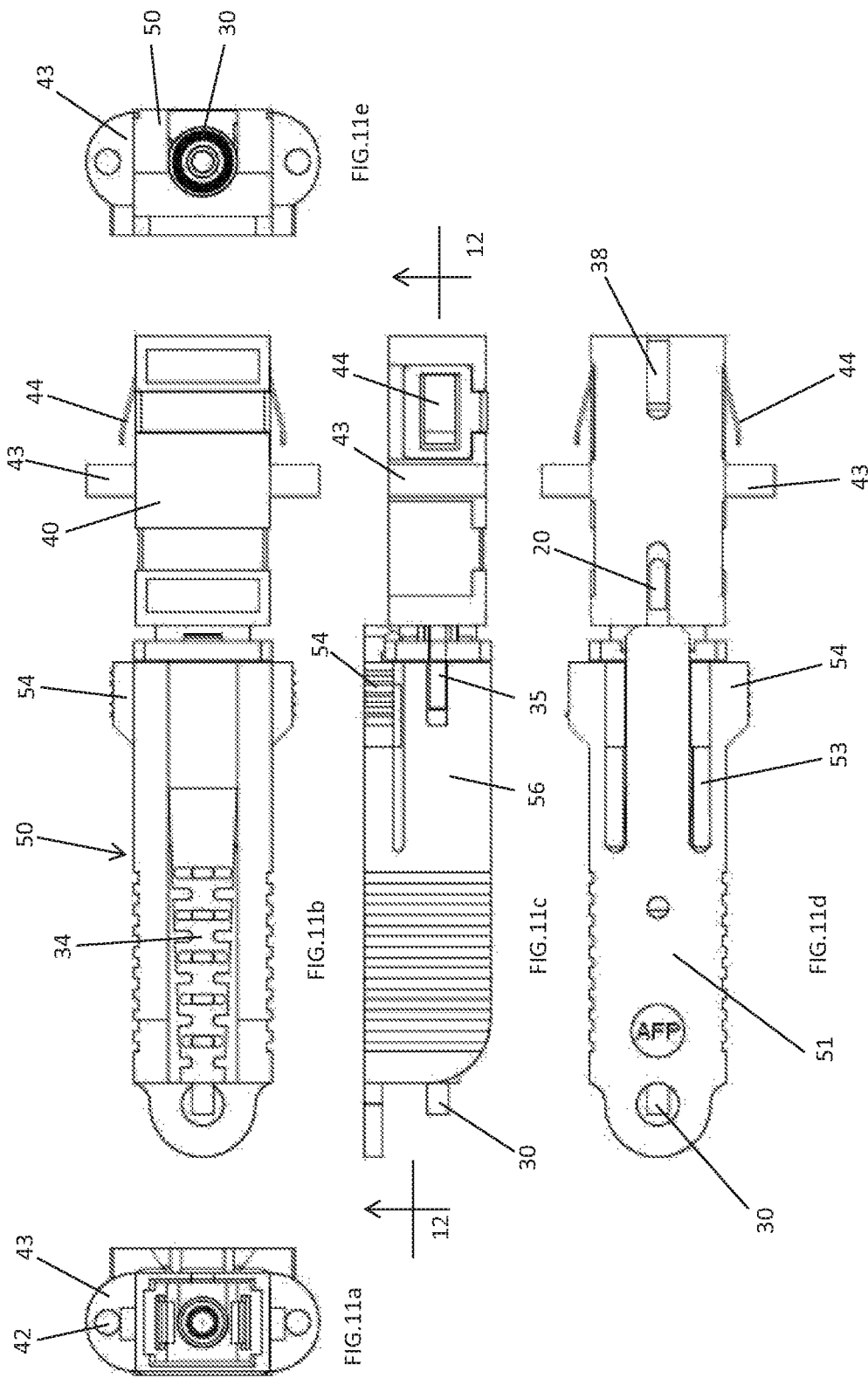
FIG. 11a is a front view of removal tool, optical fiber connector plug, and coupling adapter shown in FIG. 10.
FIG. 11b is a bottom view of the removal tool, optical fiber connector plug, and coupling adapter shown in FIG. 10.
FIG. 11c is a side view of the removal tool, optical fiber connector plug, and coupling adapter shown in FIG. 10.
FIG. 11d is a top view of the removal tool, optical fiber connector plug, and coupling adapter shown in FIG. 10.
FIG. 11e is a back view of the removal tool, optical fiber connector plug, and coupling adapter shown in FIG. 10.

FIG. 11a is a front view of the coupling adapter 40 and the optical fiber connector plug 10 within the coupling adapter 40 as shown in FIG. 10. FIGS. 11b-11d are a bottom view, side view, and top view of the removal tool 50, optical fiber connector plug 10, and coupling adapter 40 as shown in FIG. 10. FIG. 11e is a rear view of the removal tool 50 and optical fiber connector plug 10 shown in FIG. 10.

Figure 12:
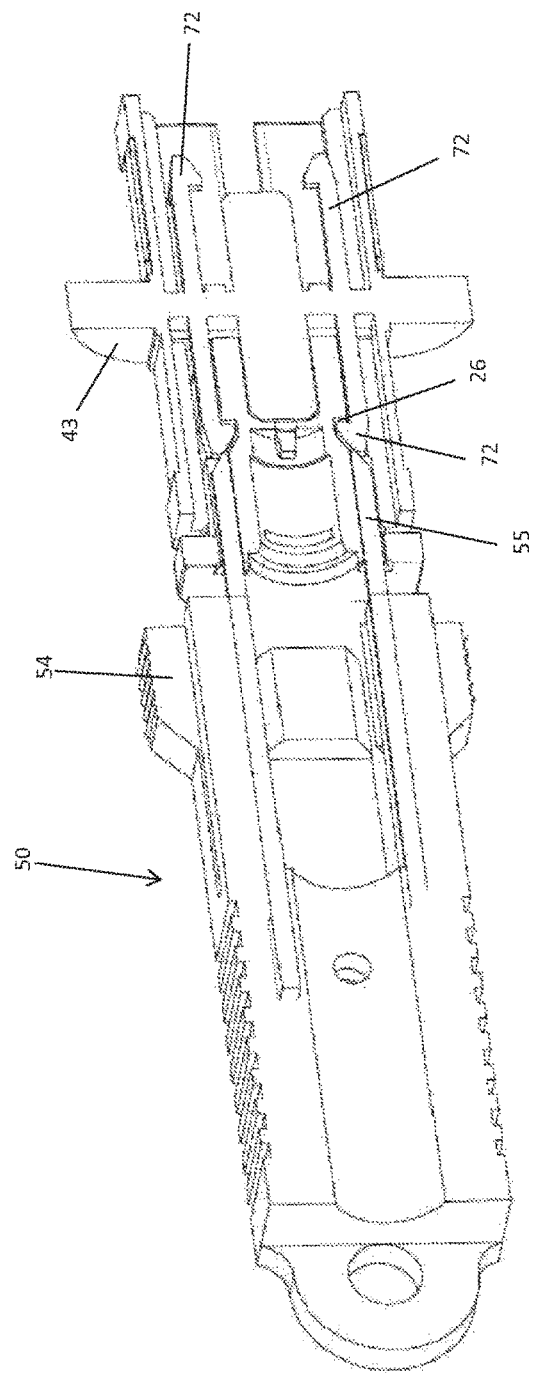
FIG. 12 is a cross-sectional view of the removal tool, optical fiber connector plug, and coupling adapter shown in FIG. 10 and FIGS. 11a-11e.

FIG. 12 is a cross-section view of the removal tool 50, optical fiber connector plug 10, and coupling adapter 40 shown in FIGS. 10 and 11a-e, and taken along line 12-12 of FIG. 11c. In accordance with the present invention, the prongs 55 of the removal tool 50 are illustrated being within the guides 22 of the housing 12 of the optical fiber connector plug 10. As the prongs 55 are fully inserted within the apertures 24 of the optical fiber connector plug 10 and passing though to the coupling adapter 40, the prongs 55 slide under latch arms 72 of the coupling adapter 40 to move the latch arms 72 out of and away from the notches 26 of the housing 12 of the optical fiber connector plug 10 to release the optical fiber connector plug 10 from the coupling adapter 40. As shown in FIG. 12, the optical fiber connector plug 10 is secured within coupling adapter 40 by the latch arms 72 fitting into the notches 26 of the optical fiber connector plug 10.

Figure 13:
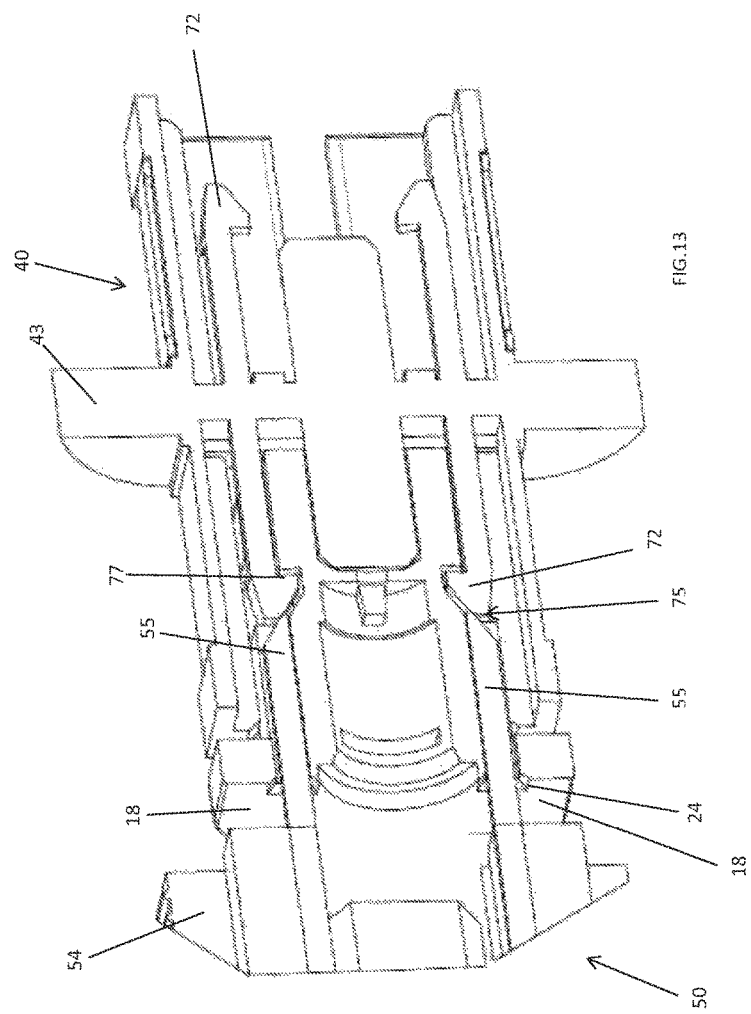
FIG. 13 is an enlarged section of the cross-sectional view shown in FIG. 12.

FIG. 13 is an enlarged view of a portion of the cross-section view shown in FIG. 12. Illustrated are a portion of the removal tool 50, optical fiber connector plug 10, and coupling adapter 40. As can be seen in more detail, the latch arms 72 of the coupling adapter 40 fit into the notches 26 in order to secure the optical fiber connector plug 10 within the coupling adapter 40. When the prongs 55 are inserted all the way into the apertures 24, the pointed end of the prongs 55 slide under the hooked portion 77 of the latch arms 72 to lift the latches 72 out of and away from the notches 26, thus releasing the optical fiber connector plug 10 from the coupling adapter 40, and enabling the optical fiber connector plug 10 to be removed from the coupling adapter 40.

Figure 14:
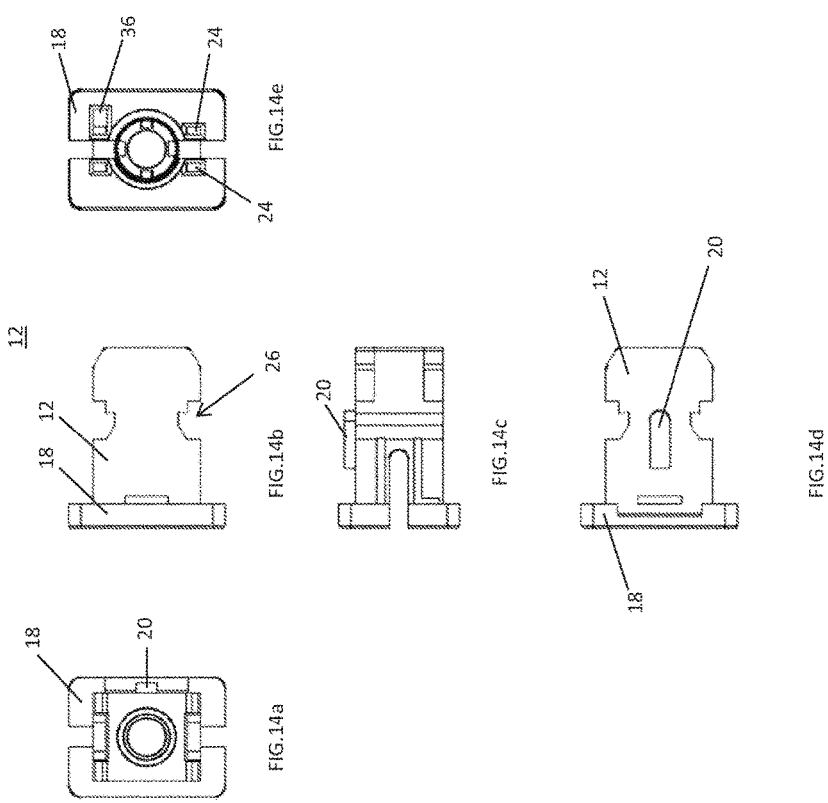
FIG. 14a is a front view of the optical fiber connector plug housing shown in FIG. 1.
FIG. 14b is a bottom view of the optical fiber connector plug housing shown in FIG. 1.
FIG. 14c is a side view of the optical fiber connector plug housing shown in FIG. 1.
FIG. 14d is a top view of the optical fiber connector plug housing shown in FIG. 1.
FIG. 14e is a back view of the optical fiber connector plug housing shown in FIG. 1.

FIG. 14a is a front view of the housing 12 of the optical fiber connector plug 10 without the fiber cable 30 and inner connector components. FIGS. 14b-d are bottom, side and top views, respectively, of the housing 12 of the optical fiber connector plug 10 without the fiber cable 30 and inner connector components. FIG. 14e is a rear view of the housing 12 without the fiber cable 30 and inner connector components, such as a metal body, spring and ferrule.

Figure 15:
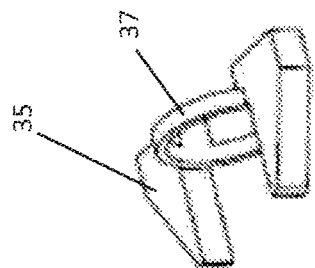
FIG. 15 is a perspective view of the anti-snag guide shown in FIG. 1.

FIG. 15 is a perspective view of the anti-snag guide 35 shown in FIG. 1. The anti-snag guides 35 are connected together by a mounting ring 37. The anti-snag guides 35 and mounting ring 37 are preferably a unitary piece constructed of plastic.

Figure 16E:
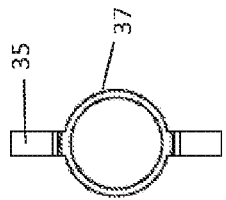
FIG. 16e is a back view of the anti-snag guide shown in FIG. 1.
Figure 16B:
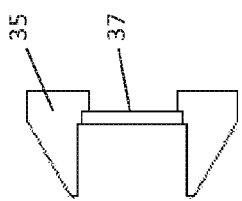
FIG. 16b is a bottom view of the anti-snag guide shown in FIG. 1.
Figure 16C:
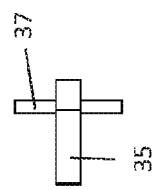
FIG. 16c is a side view of the anti-snag guide shown in FIG. 1.
Figure 16D:
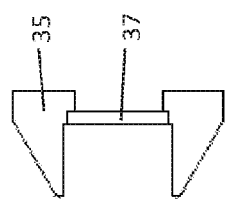
FIG. 16d is a top view of the anti-snag guide shown in FIG. 1.
Figure 16A:
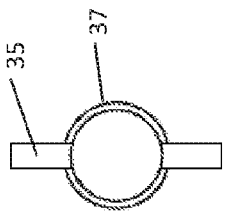
FIG. 16a is a front view of the anti-snag guide shown in FIG. 1.

FIG. 16a is a front view of the anti-snag guides 35 and mounting ring 37. FIGS. 16b-16d are views of the bottom, side, and top, respectively, of the anti-snag guides 35 and mounting ring 37. FIG. 16e is a back view of the anti-snag guides 35 and mounting ring 37.

FIG. 17 is a perspective view of the housing 12 containing a bung or connector plug 70 instead of an optical fiber cable 30. The bung 70 in the housing 12 prevents unauthorized access to an optical fiber receptacle or adapter housing by an optical fiber connector plug 10. The bung 70 is fitted into the back of the optical fiber connector housing 12 to be visible at the back of the back plate 18 and block the housing port 71 in housing 12. When the bung 70 is clipped into an optical connector housing port 71, and the housing 12 is plugged into a coupling adapter or receptacle 40, this blocks the optical fiber connector port from access and can only be removed with a corresponding keyed removal tool 50.

In accordance with an additional feature of the present invention, the removal tool 50 and a plug body feature, such as the anti-snag guide 35, have similar colors to identify they are pairs and matching to identify which plugs goes into which connector. The pattern of different width apertures 24 and prongs 55 can be changed for different color optical fiber connector plugs 10 and removal tools 50 combinations.

Figure 18:
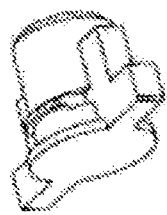
FIG. 18 is a perspective view of the bung shown in FIG. 17.

FIG. 18 is a perspective view of the bung 70 shown in FIG. 17.

Figure 19E:
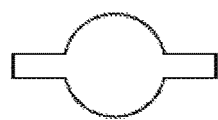
FIG. 19e is a back view of the bung shown in FIG. 18.
Figure 19B:
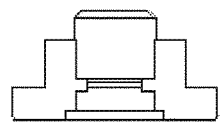
FIG. 19b is a bottom view of the bung shown in FIG. 18.
Figure 19C:
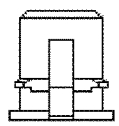
FIG. 19c is a side view of the bung shown in FIG. 18.
Figure 19D:
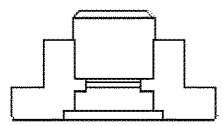
FIG. 19d is a top view of the bung shown in FIG. 18.
Figure 19A:
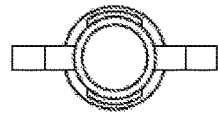
FIG. 19a is a front view of the bung shown in FIG. 18.

FIGS. 19a-e are different views of the bung 70 shown in FIG. 18. FIG. 19a is a front view, FIG. 19b is a bottom view, FIG. 19c is a side view, FIG. 19d is a top view, and FIG. 19e is a rear view.

FIG. 20 is a perspective view of a panel 80 mounting a plurality of duel optical fiber connectors 45 containing housings 12 of optical fiber connector plugs 10. The panel 80 is secured to a location by a mounting plug 82. The optical fiber connector ports 71 of the housings 12 contained within the dual optical fiber connectors 45 contain either a bung 70 or an optical fiber boot 32.

The invention claimed is:

1. An optical fiber connector plug, comprising:
    a body having a front and a rear;
    a back panel connected to the rear of the body, said back panel including a plurality of apertures for receiving prongs of a removal tool;
    a channel adjacent to each aperture for receiving a prong of a removal tool through an aperture and guiding the direction of the prong via the channel; and
    wherein one of the plurality of apertures in the back panel has a different configuration than another of the plurality of apertures in the back panel to form a keyed configuration, thereby requiring a removal tool having prongs matching the keyed configuration to pass through all the plurality of apertures on the back panel.

2. The optical fiber connector plug of claim 1, further comprising:
    a boot connected to the back panel for housing an optical fiber cable located within an optical fiber connector port of the back panel; and
    a ramp extending between an outer surface of the boot and an outer edge of the back panel to function as an anti-snag guide on the rear of the body of the optical fiber connector plug.

3. The optical fiber connector plug of claim 1, further comprising:
    a removal tool having a plurality of prongs corresponding in width and shape of the plurality of apertures in the back panel of the optical fiber connector plug, thereby configuring the removal tool to have a keyed configuration matching the keyed configuration of the plurality of apertures in the back panel.

4. The optical fiber connector plug of claim 3, wherein one of the prongs on the removal tool has a different configuration than another prong on the back panel, the configuration of the plurality of prongs corresponding to the configuration of the plurality of apertures in the back panel, thereby enabling the removal tool to be keyed to a particular optical fiber connector plug and enable all of the plurality of prongs to pass through the plurality of apertures in the back panel.

5. The optical fiber connector plug of claim 1, wherein the body includes notches for receiving latch arms to secure the optical fiber connector plug within a coupling adapter.

6. The optical fiber connector plug of claim 1, further comprising:
    a coupling adapter having an optical fiber port for receiving the body of the optical fiber connector plug;
    latch arms within the coupling adapter;
    notches within the body of the optical fiber connector plug for receiving and catching the latch arms of the coupling adapter, thereby securing the optical fiber connector plug within the coupling adapter; and
    wherein prongs received from a removal tool via the plurality of apertures in the back panel and along the channels are inserted between the latch arms and the notches so as to release the optical fiber connector plug from the coupling adapter.

7. The optical fiber connector plug of claim 1, further comprising:
    side walls on the body between the front and the rear; and
    said channels located within the side walls of the body.

8. The optical fiber connector plug of claim 1, wherein the body extends in a longitudinal direction between the front and the rear of the body, and the body is configured to be inserted into a socket in the longitudinal direction.

9. The optical fiber connector plug of claim 8, wherein the back panel is planar and extends perpendicular to the longitudinal direction of the body.

10. The optical fiber connector plug of claim 1, wherein back panel is planar and extends beyond an outer surface of the body.

11. The optical fiber connector plug of claim 2, further comprising:
    a second ramp extending between the outer surface of the boot and the outer edge of the back panel to function as an anti-snag guide on the rear of the body of the optical fiber connector plug.

* * * * *